United States Patent [19]

Lebrat

[11] Patent Number: 5,208,857

[45] Date of Patent: May 4, 1993

[54] METHOD AND DEVICE FOR SCRAMBLING-UNSCRAMBLING DIGITAL IMAGE DATA

[75] Inventor: Francois Lebrat, Paris, France

[73] Assignee: Telediffusion de France, France

[21] Appl. No.: 690,839

[22] Filed: Apr. 24, 1991

[30] Foreign Application Priority Data

Apr. 25, 1990 [FR] France .................................. 90 05269

[51] Int. Cl.[5] ............................................. H04N 7/167
[52] U.S. Cl. ........................................ 380/14; 380/10; 380/36; 380/49; 380/50
[58] Field of Search ........................ 380/10, 14, 17, 19, 380/36, 49, 50

[56] References Cited

U.S. PATENT DOCUMENTS

| | | | |
|---|---|---|---|
| 4,563,702 | 1/1986 | Heller et al. | 380/10 |
| 4,575,754 | 3/1986 | Bar-Zohar | 380/17 X |
| 4,673,975 | 6/1987 | Inaba et al. | 380/14 |
| 4,691,352 | 9/1987 | Arragon et al. | 380/14 |
| 4,757,531 | 7/1988 | Lodge et al. | 380/14 X |
| 4,774,562 | 9/1988 | Chen et al. | 358/13 |
| 4,827,338 | 5/1989 | Gerard | 358/136 |

FOREIGN PATENT DOCUMENTS

0325509 7/1989 European Pat. Off. .

OTHER PUBLICATIONS

Symposium Record, Broadcast Sessions, 16th International TV Symposium, Montreux, Jun. 17-22, 1989, pp. 387-409 Grotz et al. "Image coding techniques for 64 kbits/s channels".

Document CMTT/303-E (11/733-E), Oct. 17, 1989; Comité Consultatif International des Radiocommunications.

Primary Examiner—Bernarr E. Gregory
Attorney, Agent, or Firm—Larson and Taylor

[57] ABSTRACT

A method and device are disclosed for scrambling-unscrambling digital image data. The data is subjected to processing for extracting the colorimetric components of the pixels forming the image, the components being formed into blocks b(I,J) of N×N pixels x(i,j) so as to generate corresponding spatial chopping of the image where I designates a line index and J a column index of arrangement of the blocks in the image, i and j designating a line index and a column index of arrangement of the pixels in each block. The pixels and/or blocks are subjected to an intra-block and/or inter-block mixing procedure. The inter-block mixing consists of an arbitrary re-arrangement of said blocks of pixels and the intra-block mixing mixing consists of an arbitrary re-arrangement of the pixels os each block so as to obtain a scrambled arrangement of blocks and/or pixels.

22 Claims, 8 Drawing Sheets

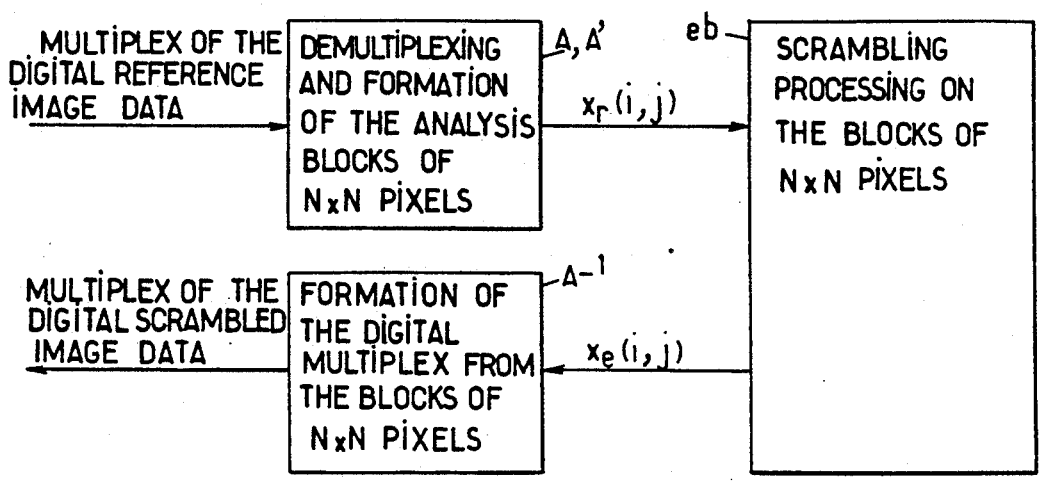
FIG.3a.   SCRAMBLING PROCEDURE
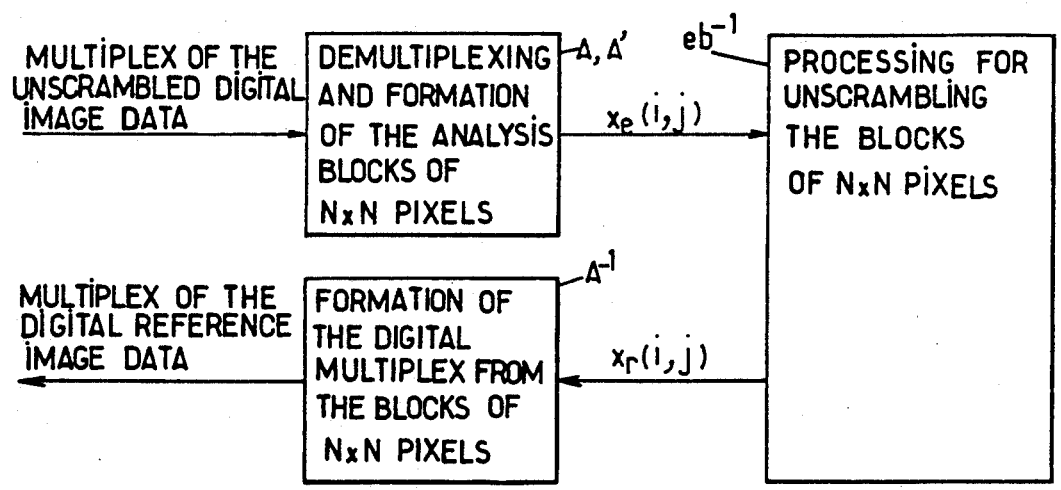
FIG.3b.   UNSCRAMBLING PROCEDURE

| SCRAMBLING OF THE BLOCKS OF N×N PIXELS (eb) | | TRANSFORMATION | EQUIVALENT SCRAMBLING OF THE N×N DCT BLOCKS (EB) $x_e(k,l)$ | EQUIVALENT UNSCRAMBLING OF THE N×N DCT BLOCKS (EB⁻¹) $x_r(k,l)$ | UNSCRAMBLING OF N×N PIXELS (eb⁻¹) | | TRANSFORMATION |
|---|---|---|---|---|---|---|---|
| | $x_e(i,j)$ | | | | | $x_r(i,j)$ | |
| IDENTITY | $x_r(i,j)$ | IDENTITY | $x_r(k,l)$ | $x_e(k,l)$ | IDENTITY | $x_e(i,j)$ | IDENTITY |
| VERTICAL MIRROR | $x_r(N-1-i,j)$ | VERTICAL MIRROR | $(-1)^k x_r(k,l)$ | $(-1)^k x_e(k,l)$ | VERTICAL MIRROR | $x_e(N-1-i,j)$ | VERTICAL MIRROR |
| HORIZONTAL MIRROR | $x_r(i,N-1-j)$ | HORIZONTAL MIRROR | $(-1)^l x_r(k,l)$ | $(-1)^l x_e(k,l)$ | HORIZONTAL MIRROR | $x_e(i,N-1-j)$ | HORIZONTAL MIRROR |
| DIAGONAL MIRROR $\frac{\pi}{4}$ | $x_r(N-1-j,N-1-i)$ | DIAGONAL MIRROR $\frac{\pi}{4}$ | $(-1)^k(-1)^l x_r(l,k)$ | $(-1)^k(-1)^l x_e(l,k)$ | DIAGONAL MIRROR $\frac{\pi}{4}$ | $x_e(N-1-j,N-1-i)$ | DIAGONAL MIRROR $\frac{\pi}{4}$ |
| DIAGONAL MIRROR $\frac{3\pi}{4}$ | $x_r(j,i)$ | DIAGONAL MIRROR $\frac{3\pi}{4}$ | $x_r(l,k)$ | $x_e(l,k)$ | DIAGONAL MIRROR $\frac{3\pi}{4}$ | $x_e(j,i)$ | DIAGONAL MIRROR $\frac{3\pi}{4}$ |
| ROTATION $\frac{\pi}{2}$ | $x_r(N-1-j,i)$ | ROTATION $\frac{\pi}{2}$ | $(-1)^l x_r(l,k)$ | $(-1)^l x_e(l,k)$ | ROTATION $\frac{3\pi}{2}$ | $x_e(j,N-1-i)$ | ROTATION $\frac{3\pi}{2}$ |
| ROTATION $\pi$ | $x_r(N-1-i,N-1-j)$ | ROTATION $\pi$ | $(-1)^k(-1)^l x_r(k,l)$ | $(-1)^k(-1)^l x_e(k,l)$ | ROTATION $\pi$ | $x_e(N-1-i,N-1-j)$ | ROTATION $\pi$ |
| ROTATION $\frac{3\pi}{2}$ | $x_r(j,N-1-i)$ | ROTATION $\frac{3\pi}{2}$ | $(-1)^k x_r(l,k)$ | $(-1)^k x_e(l,k)$ | ROTATION $\frac{\pi}{2}$ | $x_e(N-1-j,i)$ | ROTATION $\frac{\pi}{2}$ |

FIG.5.

METHOD AND DEVICE FOR SCRAMBLING-UNSCRAMBLING DIGITAL IMAGE DATA

BACKGROUND OF THE INVENTION

The invention relates to a method and device for scrambling-unscrambling digital image data.

With the recent appearance of compression and decompression techniques using, in particular discrete cosine transforms, DCT, new applications and commercial services can develop for using these techniques in the digital transmission field (digital television with bit rate reduction or transport of fixed images over service integration digital networks SIDN) or even in the field of optimizing data storage media (documentary data bases). By way of example of recent developments based on the DCT techniques, different actions may be mentioned for standardizing digital image transmission systems:

ADCT-ISO coding of photographic images for a multimedia telematic service over SIDN, reduction codecs (CMTT) for the transmission of digital data at bit rates of 32 to 45 Mbits/s.

Although the technical obstacle for maintaining the quality of the image after encoding has at the present time been overcome, the commercial use of associated services may be hindered by problems of protection of the rights of the authority providing the transmission of images, such authority desiring either to ensure the confidentiality of such transmissions, or receive fees for access to the reception of the final image.

Such problems of protecting the transmission or reserving the right of access to the use of images may be solved on condition that digital image scrambling-unscrambling systems are available used preferably under the direct control of the owner operators of the image transmission, i.e. before and after transmission and broadcasting, or under the control of service providers, prime contractors in the digital transmission chain.

At the present time, several image scrambling techniques are applied in the analog television signal transmission field.

These techniques, used at transmission, would require, for application to digital television signals, D-A conversion before scrambling then A-D conversion before transmission.

Similarly, at reception, it is necessary to provide D-A conversion then A-D conversion for unscrambling the image. Consequently, without prejudging the compatibility of the digital image compression-decompression techniques used for digital transmission, the quality of the image will thus be degraded by the multiple analog and digital conversion steps.

The above techniques are therefore difficult to apply to digital transmission.

The above techniques, particularly the transposition in the digital field of television scrambling-unscrambling techniques, namely horizontal random translation of the active video lines and D2 MAC / Packets (rotation of the contents of the active video lines with random cut-off point) is incompatible with maintaining the video quality obtained, because of the DCT type compression processing.

In fact, the purpose of such techniques is to destroy the correlation between the successive lines of the image, whereas exploitation of the correlation between adjacent pixels is the characteristic of the discrete cosine transform DCT.

More recently, a block line permutation process has been proposed by the French patent application 88 00361 filed in the name of Telediffusion De France, the assignee of the present applicant, on 14th Jan. 1988 and corresponding to European Patent No. 325509. Although the processing described in said patent relates to applications relative to digital television images, this type of scrambling-unscrambling requires the use of a digital image memory.

Furthermore, restrictions in use of this type of process must be anticipated for satisfying the particular DCT downstream processing conditions, such restrictions in particular facilitating penetration of the scrambling device by unauthorized third parties.

SUMMARY OF THE INVENTION

The object of the present invention is to overcome all said drawbacks by providing a method and device for scrambling-unscrambling digital images making possible the use of fixed image compression or bit rate reduction systems based on block analysis of the images, in the absence of any additional degradation of the video quality of the images.

Another object of the present invention is, through the use of the method and/or device of the invention, the implementation of systems controlling access to or protection of the fixed or animated images, these systems being usable for commercializing image programs distributed through digital transmission networks.

Another object of the present invention is finally the provision of a method and device for scrambling-unscrambling digital signals representative of images, this method and this system being usable in this case either outside the digital transmission chain, under the control of the owner operators of the transmission, i.e. before the points at which the transmission is taken over and after the points of delivery by the users of the digital images, or in the digital transmission chain itself, under the control of service providers ensuring the transmission as main contractor for this transmission.

The method for scrambling-unscrambling digital image data, forming the object of the present invention, is remarkable in that, for scrambling, it consists in processing data for extracting the colorimetric components of the pixels then forming the image then forming these components into blocks $b(I,J)$ of $N \times N$ pixels, so as to generate corresponding spatial chopping of the image, I designating a left to right line index and J a top to bottom column index of arrangement of the blocks in the image. For each block $N \times N$ thus defined, the pixels are represented by $x(i,j)$, i designating a line index (0 to N-1 from left to right) and j designating a column index (0 to N-1 from top to bottom) of arrangement of the pixels in the block. The pixels and/or the blocks are then subjected to an inter- and/or intra-block mixing procedure. The inter-block mixing consists in an arbitrary rearrangement of the blocks of pixels $b(I,J)$ and the intrablock mixing consists of an arbitrary re-arrangement or particular processing of the pixels $x(i,j)$ of each block so as to obtain a scrambled arrangement of blocks and/or of pixels.

The scrambling-unscrambling method and device of the present invention find an application particularly in the emission, broadcasting and transmission of digital image signals, such as television image signals, as well as the protection of digital images stored after compression on data processing media, and also in any field using compression techniques based on analysis of the image by blocks (digital TVHD bit rate reduction codecs ...).

BRIEF DESCRIPTION OF THE DRAWINGS

A more detailed description of the method and device of the present invention will now be given with reference to the accompanying drawings in which, apart from FIGS. 1a, 1b of the prior art relative to the techniques of compression respectively decompression of digital images using discrete cosine transform DCT. For each block b(I,J) of N×N pixels processed by DCT, the DCT coefficients are represented by X(k,l), k designating a line index (0 to N-1 from left to right) and l designating a column index (0 to N-1 from top to bottom) of arrangement of the coefficients in the DCT block N×N, FIG. 2 at points a, b, c, b', c' and c" illustrates the steps for implementing the scrambling-unscrambling method in particular the scrambling procedure in the case where it is used respectively in the absence of the DCT discrete cosine transform processing procedure, and subsequent to the DCT discrete cosine transform procedure, FIGS. 3a and 3b represent a complete block diagram of the steps for implementing the method of the present invention relative both to the scrambling procedure prior to the discrete cosine transform compression procedure and to the unscrambling procedure subsequent to the inverse discrete cosine transform decompression procedure DCT$^{-1}$, FIG. 5 is a synoptic table, on the one hand, of the different intra-block scrambling operations of the N×N pixels x(i,j) and on the other hand of the equivalent scrambling operation of the DCT coefficient blocks, X(k,l)

DESCRIPTION OF THE PREFERRED EMBODIMENTS

Before describing the method and device for scrambling-unscrambling digital image data in accordance with the present invention, a reminder of the essential steps of image compression-decompression processing by discrete cosine transform respectively inverse discrete cosine transform will be given in connection with FIGS. 1a and 1b.

By way of example, compression-decompression processing by discrete cosine transform and by inverse discrete cosine transform DCT, DCT$^{-1}$ will be given in the case of transmission by multiplexing digital image data, such as television images for example.

Figure 1A:
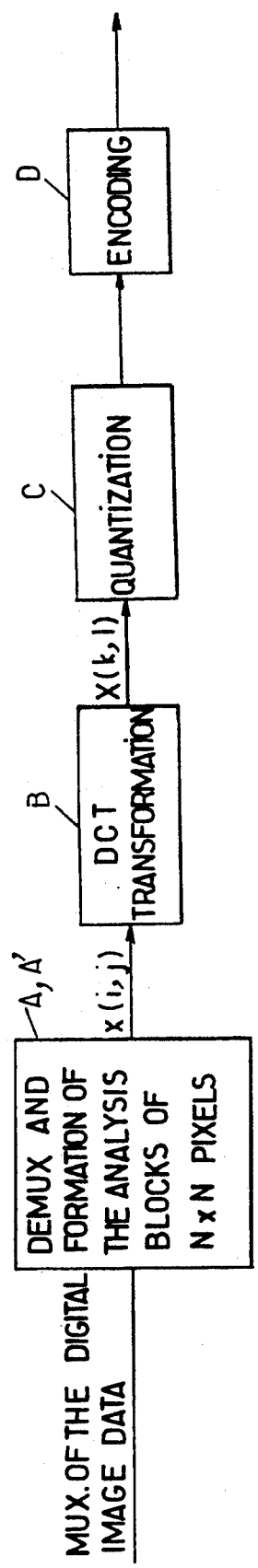

In FIG. 1a, a block diagram has been shown illustrating DCT digital image compression. The multiplex of the digital image data, for compression processing, is subjected to the main steps consisting of demultiplexing the digital image data A so as to form, with each component, rectangular blocks b(I,J) of N×N pixels corresponding to spatial chopping of the image. The formation of said analysis blocks is known from the state of the art and is referenced A' in FIG. 1a. The pixels of the blocks of N×N pixels are referenced x(i,j) where:

i is a line index, i varying from 0 to N-1 from left to right, j is a column index, j varying from 0 to N-1 from top to bottom.

The pixels x(i,j) are then subjected at B to discrete cosine transformation DCT applied to each block of N×N pixels x(i,j). The DCT transformation delivers blocks of N×N DCT coefficients x(k,l) where:

k designates a line index from 0 to N-1 from left to right, l designates a column index from 0 to N-1 from top to bottom.

The DCT coefficient blocks are then subjected at C to a quantization procedure, the quantization law used depending on the desired compression factor as well as on the type of component of the processed signal, luminance component Y or chrominance component Cr, Cb in the case of a television digital image signal, as mentioned above.

The quantized DCT coefficients delivered following step C are then subjected to an encoding step at D, so as to restore a digital image multiplex after compression and thus ensure transmission of the digital image data after compression, the compression being such as to provide protection against transmission errors during said digital transmission and to eliminate the information redundancy.

Figure 1B:
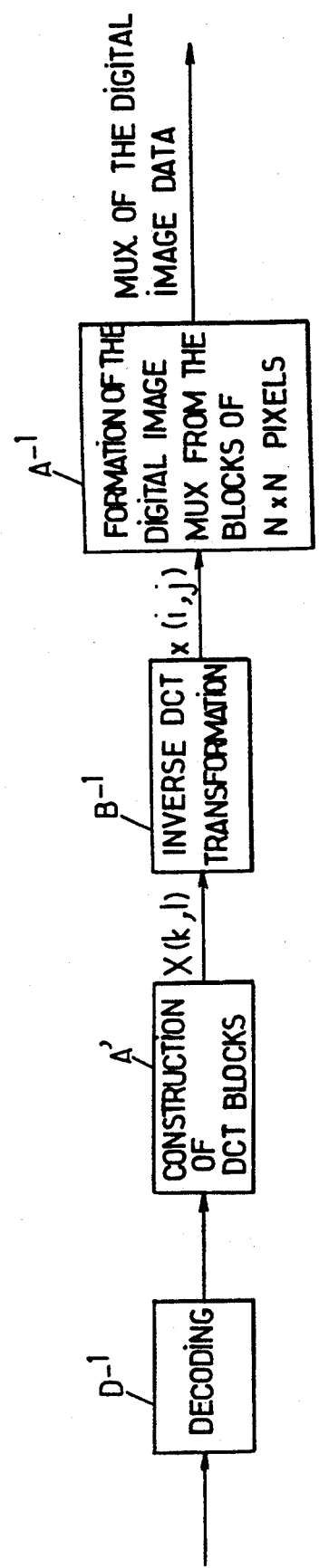

With such transmission effected, at reception, the restored digital multiplex mentioned above is first of all subjected to a decoding step D$^{-1}$ followed by a step for construction of the DCT blocks, this step being referenced A' in FIG. 1b by analogy with step A' of FIG. 1a. In this step, said DCT coefficients are reconstituted into blocks of DCT coefficients X(k,l). They are then subjected to an inverse DCT transformation step B$^{-1}$ which restores the corresponding blocks of pixels x(i,j) from the DCT coefficient blocks. The blocks of pixels x(i,j) are then subjected to a step for forming a digital image multiplex from the blocks of N×N pixels, this new step being referenced A$^{-1}$ in FIG. 1b and allowing the multiplex of the digital image data to be formed which will then be delivered for use.

Of course, the steps for decompression of the image data such a shown in FIG. 1b correspond to the inverse processing of the image compression steps such as shown in FIG. 1a.

For a detailed description of the properties of the discrete cosine transforms, reference may be advantageously made to the document 11/733-F of 24th Oct. 1989, appendices II, III and IV, published by the study commission 11 of the CCIR (Comité Consultatif International des Radiocommunications).

In so far as the properties of the discrete cosine transforms is concerned, it will be simply recalled that to any set of pixels forming a block of N×N pixels, each pixel being encoded for example in luminance and chrominance, an identical number of DCT coefficients can be caused to correspond in luminance and chrominance by means of a DCT transform, the DCT coefficients being substantially distributed in the useful frequency band of the digital image signal and representative of the energy levels as a function of said frequency components.

The quantization procedure taking place after the DCT transformation then allows the corresponding image compression to take place as a function more particularly of the bit rate reduction parameters desired for the transmission.

A more detailed description of the method for scrambling-unscrambling digital image data of the present invention will now be given with reference to FIG. 2.

In said figure, for scrambling, the data represented symbolically by pixels p at a, these pixels being assumed to form for example a television or other image, are subjected to processing for extracting the colorimetric components of the pixels forming the image. At point a in FIG. 2, it will be noted that the pixels assumed to represent for example the letter Q, have been represented by a set of circular spots. Furthermore, the processing for extracting the colorimetric components of the pixels forming the image makes it possible in the case of a digital television type image to extract the luminance Yp and chrominance Crp, Cbp components of each of the pixels considered. Of course, this type of processing is conventional processing and will not be described in detail. For simply illustrating the scrambling method, the luminance and chrominance sampling structures of FIG. 2 are identical, the processing being in any case carried out independently on each component in the general case.

Said step a is further followed by a step b consisting in forming said components into blocks b(I,J) containing a given number of pixels, N×N pixels. Of course, at point b of FIG. 2, four blocks have been shown from which the letter Q previously shown at a can be distinguished. Said colorimetric components, particularly of luminance and chrominance, are then formed into blocks so as to generate the corresponding spatial chopping of the image, the indices I and J of the blocks designating respectively a line index and a column index of arrangement of the blocks in the image.

Figure 2:
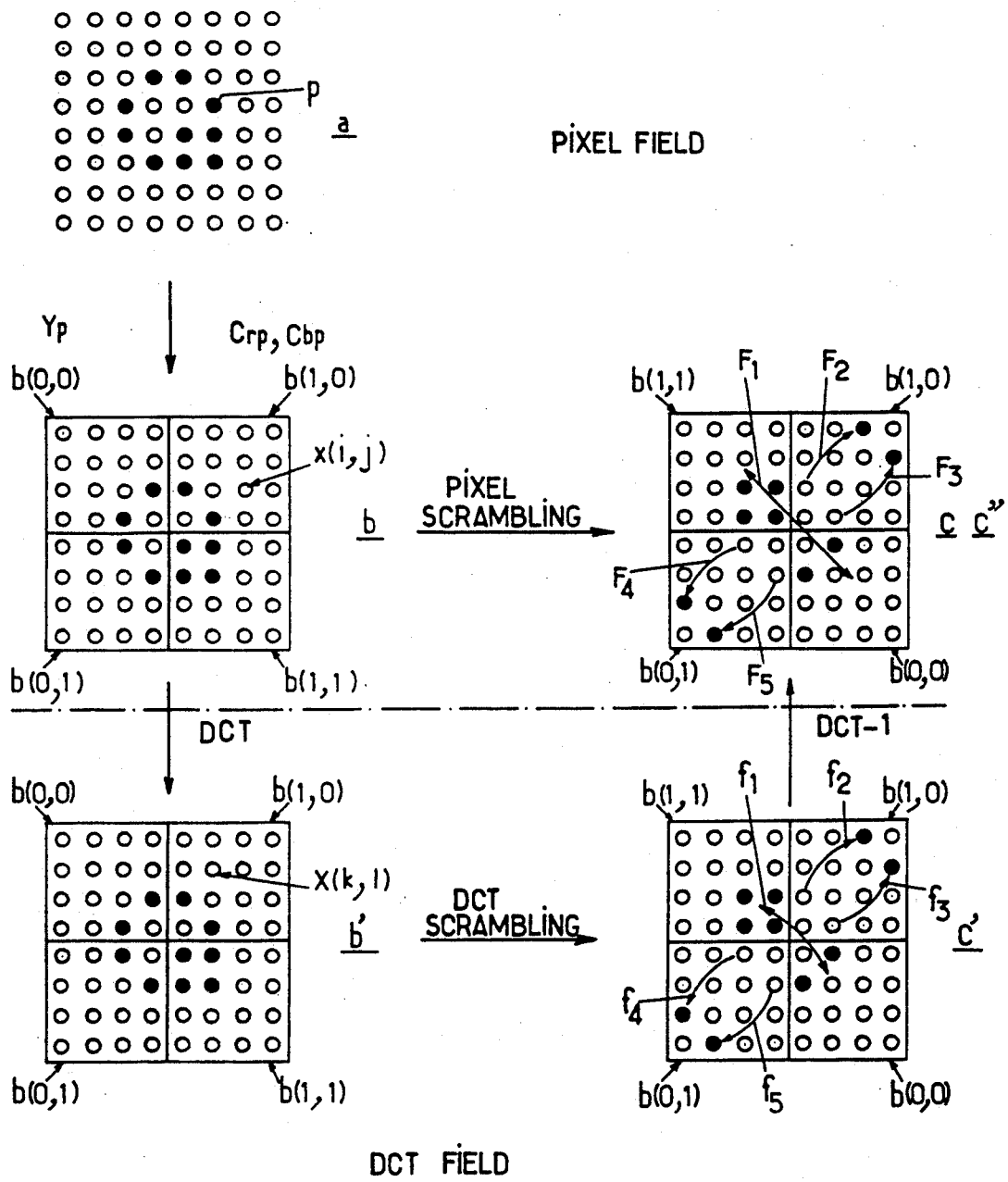

Then, as is shown at point c in FIG. 2, the pixels x(i,j) and/or the blocks b(I,J) are then subjected to an inter- and/or intra-block mixing procedure as shown at c in FIG. 2.

As can be seen from this figure, the inter-block mixing consists in an arbitrary re-arrangement of the blocks of pixels, this arbitrary re-arrangement being for example symbolized by the arrow F1, which indicates that the diagonal blocks b(0,0) and b(1,1) of point b have been permuted. Of course, it will be noted that the blocks of pixels subject to the inter-block processing may be formed by said blocks b(I,J), or by blocks of a different dimension N×N, a combination of blocks b(I,J) for example, as will be described subsequently.

The intra-block mixing consists for example of an arbitrary re-arrangement of the pixels x(i,j), i.e. of their value as colorimetric components, luminance respectively chrominance, so as to obtain a scrambled arrangement of pixels in a block. In FIG. 2 at point c, the intra-block mixing has been shown for blocks b(1,0) and b(0,1) by means of arrows F2, F3 respectively F4, F5, these arrows with respect to the blocks b(0,1), b(1,0) of point b of the same figure indicating the migration of the pixels, i.e. of the colorimetric component values, luminance respectively chrominance, to different addresses in the same block, in accordance with a symmetry with respect to a diagonal axis of the block.

It will thus be seen that, following step c, the arrangement of the pixels formed by the initial dots representative of the letter Q form in fact a scrambled arrangement of blocks and/or of pixels, the letter Q being no longer recognizable.

It will be noted in particular that the scrambling-unscrambling method of the present invention, particularly in so far as the use of the scrambling procedure is concerned, may be used in the case of digital image data such as digital television images or fixed images, in the absence of compression-decompression processing of images by discrete cosine transform DCT.

On the other hand, a more detailed description of one embodiment of the method of the present invention, more particularly used in the case of digital television images, for implementing a scrambling procedure using the DCT processing will be described in connection with FIG. 2.

According to an advantageous characteristic of the method of the present invention, it consists, as shown at point b', respectively c', subsequent to step b of chopping the image into blocks, in subjecting the colorimetric components, particularly the luminance and chrominance components Yp, Crp, Cbp to discrete cosine transform processing DCT, so as to obtain corresponding blocks of DCT coefficients X(k,l) where k designates a DCT block line index and l a corresponding DCT coefficient block column index.

As has been further shown in FIG. 2, the blocks of pixels such as shown at point b in this same figure are first of all subjected at the point referenced b' to a discrete cosine transform processing procedure DCT. Following such transformation, the luminance respectively chrominance values of each pixel are transformed into corresponding digital values as mentioned above. It will be noted that the values indicated at points b' in FIG. 2 can in no case be considered as significant values of DCT coefficients, the pixels formed by spots at point a or b in FIG. 2 being however attributed arbitrarily with identical signs representative of DCT coefficients for the needs of the description. It will thus be considered that in step b' in FIG. 2, the representation of the image in DCT coefficient values by the blocks b(0,0), b(0,1), b(1,0), b(1,1) is maintained at the value attributed to the DCT coefficients of the pixels representative of the letter Q forming this representation.

In accordance with the method of the present invention, such as shown in FIG. 2, the inter- and/or intra-block mixing procedure is then carried out on and/or in the blocks of DCT coefficients, X(k,l), subsequent to the DCT processing procedure. Said mixing procedure, as shown at point c' in FIG. 2 similarly to the mixing procedure as shown at point c in FIG. 2, is represented by arrows f1 which indicate the permutation of the blocks b(0,0) and b(1,1) for providing the inter-block mixing, the "migration" of the DCT coefficients for the blocks b(1,0) and b(0,1) of DCT coefficients being represented by the arrows f2 and f3 respectively f4 and f5 so as to ensure migration comparable to the migration of the pixels for the blocks b(0,1) and b(1,0) of point c in FIG. 2. It will however be noted that the intra-block transformations F2, F3, F4 and F5 of point c in FIG. 2 are not represented by identical transformations f2, f3, f4, f5 at point c' in FIG. 2, but by equivalent transformations which will be described subsequently, whereas the inter-block transformations F1, f1 are identical.

As has been shown in FIG. 2, the method of the present invention, implementing the scrambling procedure, may be achieved using either steps a, b and c of FIG. 2, the inter-and/or intra-block mixing procedure being carried out on or in the blocks of pixels x(i,j) prior to the DCT processing procedure, or by steps a, b, a', b', c' and c", the inter- and/or intra-block mixing procedure being carried out on and/or in the blocks of DCT coefficients X(k,l) subsequent to the DCT processing procedure.

In certain conditions, a mixing procedure, deliberately shown identical at point c" of FIG. 2 to that at point c in FIG. 2, allows the same arrangement of scrambled pixels and/or blocks to be obtained through equivalent transformations in the pixel field with or without transformation in the DCT field.

In the case where the image data is formed by multiplexed digital television image data, the colorimetric components being available in the form of luminance Yp respectively chrominance Crp, Cbp components, the scrambling procedure in accordance with the digital data scrambling-unscrambling method of the present invention, in particular the intra-block scrambling procedure when it is applied by mixing on the blocks of pixels x(i,j), may advantageously consist in inversion of the luminance and/or chrominance components of the pixels of the block x(i,j) of pixels considered. It will thus be understood that such inversion results in making the image unusable. Of course, such inversion of the luminance and chrominance components may be applied to the blocks of DCT coefficients X(k,l).

According to another aspect of the method of the present invention, the inter- and/or intra-block mixing procedure, when this mixing procedure is applied to the blocks of DCT coefficients, may advantageously consist in modifying either the sign of certain DCT coefficients X(k,l) of one or more blocks considered, or the absolute inter- and/or intra-block address of DCT coefficients, the amplitude of these coefficients being maintained, as will be described subsequently.

A more complete description of the whole of the scrambling-unscrambling method of the present invention will now be given with reference to FIGS. 3a, 3b and 4a, 4b.

In FIGS. 3a and 3b, in the case where the scrambling-unscrambling is applied to blocks of pixels, the multiplex of the digital data of images called reference images, those which are subjected to transmission, is first of all subjected to demultiplexing and to a step of forming analysis blocks of N×N pixels, this processing step being referenced A, A' in FIG. 3a, similarly to FIG. 1a previously described. The blocks of so-called reference pixels xr(i,j) are subjected to a scrambling procedure eb, this scrambling procedure eb possibly corresponding, for example non limitatively, to the inversion of the luminance and/or chrominance components of the pixels of the block of pixels considered, to inter- and/or intra-block mixing of pixels. The blocks of scrambled pixels xe(i,j) obtained following such processing eb are then subjected to a step for forming the digital image multiplex from blocks of N×N scrambled pixels, this digital multiplex formation step being referenced $A^{-1}$ for it corresponds to the inverse step of the demultiplexing step A previously described for FIG. 3a.

For implementing the unscrambling procedure as shown in FIG. 3a, the multiplex of the digital scrambled image data, previously obtained at the end of processing steps such as shown in FIG. 3a after step $A^{-1}$, is then subjected to a step for demultiplexing and forming analysis blocks of N×N pixels A, A' in FIG. 3b, which restores the blocks of scrambled pixels xe(i,j). These scrambled blocks of pixels are then subjected to unscrambling processing $eb^{-1}$, such processing restoring the blocks of pixels xr(i,j). The blocks of pixels xr(i,j) are then subjected again to a step for forming the digital image multiplex from the blocks of N×N reference pixels, this step being referenced $A^{-1}$ in FIG. 3b. Following this step, the multiplex of the digital reference image data may be delivered to the user, the image being restored in its original configuration.

Figure 4A:
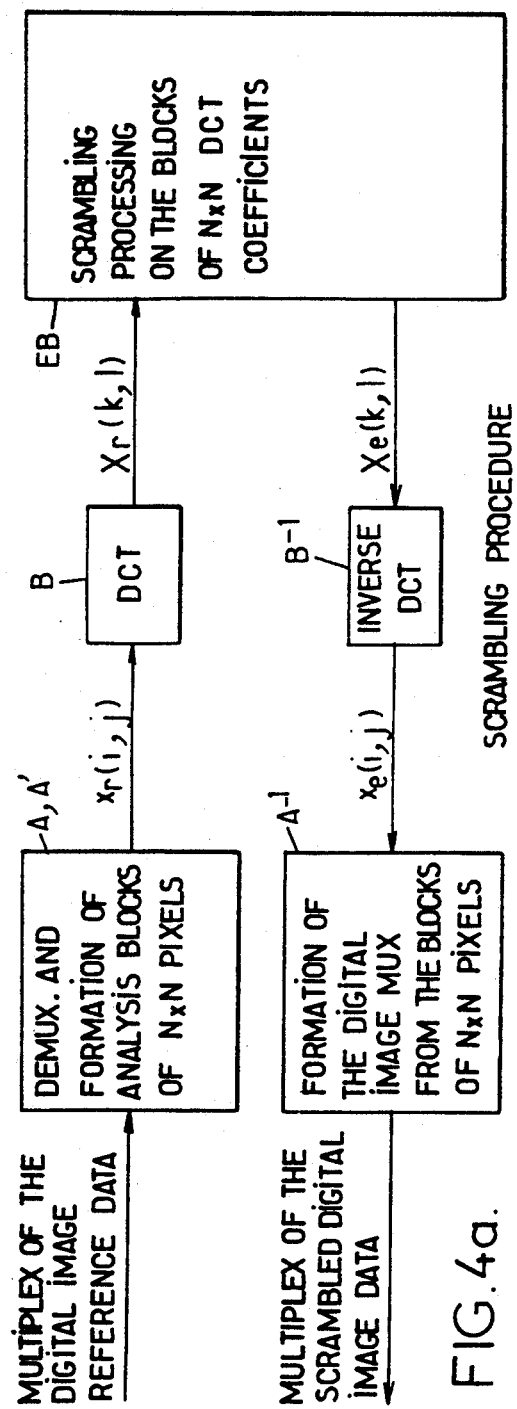
FIGS. 4a and 4b show a complete block diagram of the steps for implementing the method of the present invention relatively both to the scrambling procedure subsequent to the discrete cosine transform compression procedure and to the unscrambling procedure prior to the inverse discrete cosine transform decompression procedure DCT$^{-1}$.
Figure 4B:
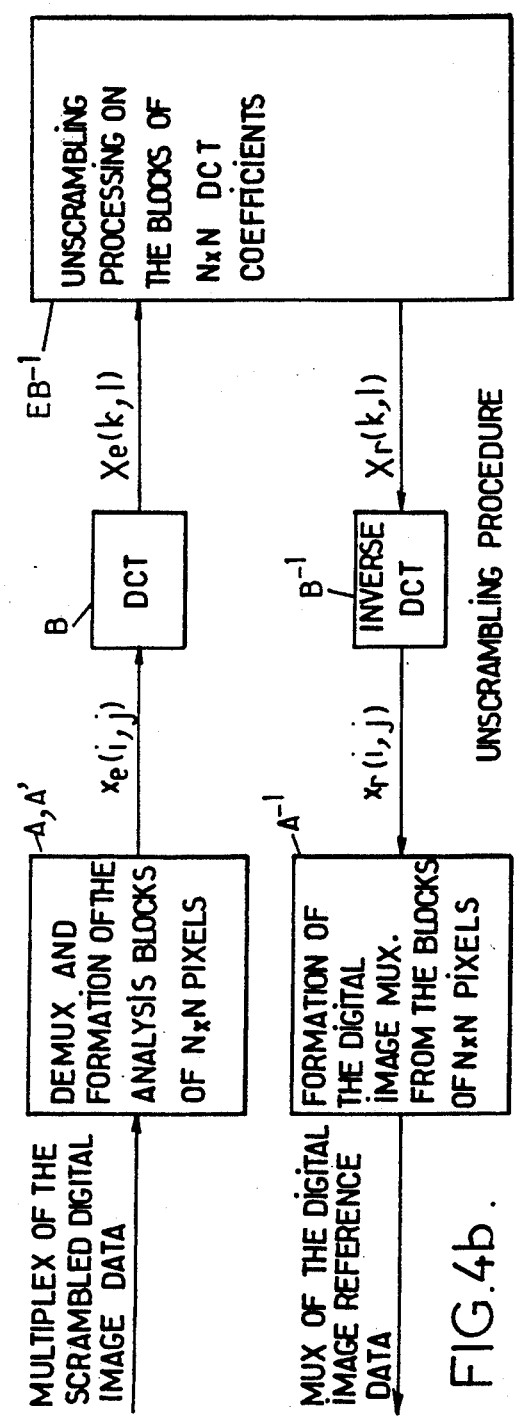

On the contrary, when the scrambling-unscrambling procedure is carried out on the DCT coefficient blocks, as shown in FIGS. 4a and 4b respectively, particularly for broadcasting digital television images, the scrambling procedure of the present invention comprises, at emission, following N×N pixel analysis formation processing and a multiplexing step, these two steps being referenced A, A' in accordance with the prior conventions, a discrete cosine transform processing step B, this step being applied to the blocks of reference pixels xr(i,j). Said step B makes it possible to obtain the corresponding DCT coefficients, which are organized into blocks of N×N DCT coefficients, these blocks being referenced Xr(k,l). Of course, the discrete cosine transform processing step consists in applying said transformation to the luminance and chrominance components of the N×N pixels of each block xr(i,j). Following said step B, the blocks of coefficients Xr(k,l) are subjected to a scrambling procedure step, for obtaining for each analysis block, a block of N×N scrambled DCT coefficients Xe(k,l).

An inverse discrete cosine transform processing step $DCT^{-1}$, referenced $B^{-1}$, of the scrambled coefficients Xe(k,l) is provided so as to obtain for each analysis block a scrambled distribution of pixels Xe(i,j). The scrambled distribution of pixels and in particular of blocks of pixels xe(i,j) is then subjected to a digital multiplexing step for forming images from the blocks of pixels of N×N pixels, referenced $A^{-1}$ in FIG. 4a. The scrambled image digital data multiplex is thus obtained outside the reduced bit rate digital transmission chain.

This step may be omitted in the case where the scrambling processing is integrated in the DCT bit rate reduction processing encoder equipment and advantageously replaced by steps C and D of FIG. 1a.

Similarly, as shown in FIG. 4b, in the case of a digital television image, the method of the present invention comprises, at reception outside the digital transmission chain with reduction of the bit rate of the scrambled image digital data multiplex, following the processing of the method such as shown in FIG. 4a, a step for demultiplexing and forming analysis blocks of N×N pixels A, A', in accordance with the prior conventions, this step making it possible to obtain blocks of scrambled image pixels xe(i,j). Said blocks of scrambled image pixels are then subjected to a step for processing, by discrete cosine transform DCT, the chrominance and luminance components of the N×N pixels of each scrambled block so as to obtain N×N DCT scrambled coefficients Xe(k,l) for each of the corresponding blocks.

This step may be advantageously replaced by steps $D^{-1}$ and $A'$ of FIG. 1b in the case where the unscrambling processing is integrated in the DCT bit rate reduction processing decoder equipment.

The blocks of scrambled coefficients Xe(k,l) are then subjected to an unscrambling procedure step $EB^{-1}$, this unscrambling procedure corresponding to the inverse transformation of the scrambling procedure EB in FIG. 4a. This unscrambling procedure allows N×N DCT coefficients Xr(k,l) to be obtained for each analysis block corresponding to reference DCT coefficient blocks. Each reference DCT coefficient block corresponds to a block representative of an unscrambled DCT coefficient block.

An inverse discrete cosine transform processing step $DCT^{-1}$, step $B^{-1}$ according to the prior conventions, allows an unscrambled distribution of the luminance and chrominance components to be obtained for each block in corresponding reference blocks of N×N pixels xr(i,j). The blocks of pixels xr(i,j) thus obtained are then subjected to a step for forming the digital image multiplex, this step being referenced $A^{-1}$ in accordance with the prior conventions. The multiplex of the digital reference image data may then be delivered to the user.

All the variants for implementing the scrambling-unscrambling method of the invention results, in the DCT transformation field, in mixing of the blocks N×N of DCT coefficients X(k,l) of the image or by mixing inside the DCT blocks of the coefficients of these blocks. The video quality of the images is maintained by conserving, after unscrambling, the integrality of the amplitudes of the DCT coefficients of the original image.

Two categories of scrambling processing have been distinguished:
the intra-block processing and inter-block processing.

A more detailed description of particularly advantageous intra-block processing, particularly in the case of digital television images, will be given in connection with FIG. 5.

In the case of intra-block mixing carried out on the DCT coefficient blocks, the scrambling and mixing methods used aim at modifying the distribution of the DCT coefficients, X(k,l), in the corresponding blocks or modifying the sign of certain coefficients.

Because the amplitude of each DCT coefficient is respected, degradation related to scrambling can only occur in the following quantization step.

So as not to introduce degradation into the corresponding compression step, the method of the invention uses the characteristics of the quantization laws which proceed from the properties of the DCT coefficient blocks, X(k,l), i.e.:
maintenance of the coefficient X(0,0)
possible inversion of the sign of the other coefficients X(k,l),
possible permutation of pairs of symmetrical coefficients with respect to the diagonal defined by X(0,0), X(B-1, N-1), the permutation being defined by the relation: $X(k,l) \rightarrow X(l,k)$.

Such scrambling methods may be simply used in image compression-decompression equipment between the steps for DCT transformation (respectively inverse transformation $DCT^{-1}$) and quantization (respectively inverse quantization) of the DCT blocks. Such a solution is economical for it only adds an additional step for processing the DCT coefficients X(k,l) in the compression-decompression equipment. Such use however implies that only the service provider, who as prime contractor ensures the transport of the signals, may effect the scrambling which prevents direct control of confidentiality at the transmission source by the operators.

When, on the other hand, said scrambling methods are used upstream of the image compression device, i.e. at the level of the image blocks b(I,J) of pixels x(i,j), two solutions may be applied so as to produce the same scrambling characteristics in the DCT field.

A first solution consists in creating a system equivalent to the association of two image compression-decompression equipments in which the quantization and encoding steps are replaced by a scrambling step by manipulating the blocks of DCT coefficients X(k,l) as shown in FIGS. 4a respectively 4b in which upstream processing of the blocks of pixels x(i,j) is thus effected.

Said solution is more costly for it involves the use in the scrambling-unscrambling chain of two additional DCT processing steps, the processing B and $B^{-1}$ in FIGS. 4a respectively 4b.

The second solution consists in using the properties of the DCT transformation for applying the scrambling processing directly to the blocks of N×N pixels and so being able to form economic scrambling systems as shown in FIGS. 3a and 3b.

Referring to the definitions and notations given in the appendix at the end of the present description, the method of the invention defines the scrambling-unscrambling procedures applicable to the blocks of N×N pixels x(i,j), these procedures corresponding to procedures in the DCT field of the DCT coefficients X(k,l) in conformity with maintaining the DCT quality previously defined.

In the case of transformations for the scrambling-unscrambling procedure, such as shown in FIG. 5, the scrambling effected upstream on blocks of N×N pixels x(i,j) is equivalent to scrambling carried out downstream on blocks of N×N DCT coefficients X(k,l).

It will be noted that the transformations for said scrambling procedures at the level of the blocks of N×N pixels, scrambling procedure, eb and procedure for unscrambling these same blocks of pixels, $eb^{-1}$ correspond respectively for example to the identity transformation, vertical mirror, horizontal mirror, diagonal mirror $\pi/4$, diagonal mirror $3\pi/4$, rotation $\pi/2$, rotation $\pi$, rotation $3\pi/2$ for each block b(I,J) considered.

The procedure for scrambling the image is then obtained by associating with each block of pixels of the image a transformation or a combination of transformations already mentioned.

Scrambling systems using DCT or pixel intra-block processing may be formed by means of a scrambling respectively unscrambling table which associates with each block b(I,J) one of the processing procedures or a combination of processing procedures previously described in connection with FIG. 5.

The complexity of the scrambling systems thus depends on the variety of the processing procedures chosen and the degree of difficulty of penetrating the access code depends on the complexity of the correspondence table. Techniques using the generation of pseudo-random sequences for combining said transformations may be used in order to construct correspondence tables and thus limit access to the information required for unscrambling images so as to provide access control.

Furthermore, the properties of the quantizer processing the DCT coefficients may be used to provide other transformations on the blocks. Thus, and in the case where the accuracy of the quantization is maintained when the signs of the DCT coefficients or of the pixels is changed, it is possible to use the transformation multiplication by $-1$.

On the other hand, in the design of scrambling systems, it is necessary to take into account certain complementary processing procedures which may be carried out downstream of the compression by DCT and consequently adapt the correspondence tables between associated blocks and processing procedures. Such additional constraints may occur in the processing of animated image compression with for example the use of techniques for prediction of inter-frame or inter-image blocks or movement compensation.

In so far as inter-block processing is concerned, the scrambling methods used may be based on mixing in the image of the blocks of pixels used for the DCT compression performed subsequently.

The above mentioned mixing may be carried out either on the blocks of pixels of the image or on the blocks of DCT coefficients.

The scrambling procedures which will now be described relatively to inter-block scrambling are relative to transformations carried out in the image field, such transformations being applied by analogy in the DCT field.

It will be recalled that the image or the frame is broken down into blocks $b(I,J)$ of pixels where I and J designate the coordinates of the block in the image, I thus designating a line index of the block in the image, I varying from 1 to P-1 from left to right and J an index of the column of the block in the image, J varying from 0 to Q-1 fro top to bottom. It will be noted, as mentioned above, that the blocks $b(I,J)$ of pixels may be equal to or multiples of the blocks of pixels previously described in the description.

A first scrambling-unscrambling processing set may consist in a bijective application, in the set of $P \times Q$ indices I,J, of the image blocks for associating a new set of indices (I',J') defining the table of correspondence of the blocks of the mixing applied.

Such a technique may be used with an image memory organized in blocks of pixels so as to allow addressing to each pair of indices I, J of a new pair I',J' defined by the mixing table.

The number of possible permutations inside the $P \times Q$ pairs, (I,J) is $P \times Q!$, which provides very high protection of the scrambling.

A restriction of the set of possible permutations may simplify the construction of the equipment for example by keeping systems based on permutations inside the possibility lines P! or inside the possibility of columns Q!.

More complex systems may be envisaged by combining the permutations in lines and columns, $P! \times Q!$ possibilities.

Furthermore, the variety of the possible permutations will be increased by allowing permutations between blocks of colorimetric components, namely, in the case of digital television images, of luminance respectively chrominance, which are different when the laws applicable to the quantization and to the encoding of the DCT coefficients thereof are identical.

A more detailed description of a device for scrambling-unscrambling multiplexed image data, particularly digital television images, in accordance with the invention will be given with reference to FIG. 6a.

The intra-block and inter-block scrambling-unscrambling method of the present invention has been used in the image field by creating devices for manipulating digital image pixels in accordance with the digital television standard 4-2-2 drawn up by the recommendation 601 of the CCIR. The device described in connection with said figure makes it possible to carry out scrambling or unscrambling in real time on 4-2-2 digital television signals transmitted over a parallel interface in accordance with recommendation 656 of the CCIR.

Figure 6A:
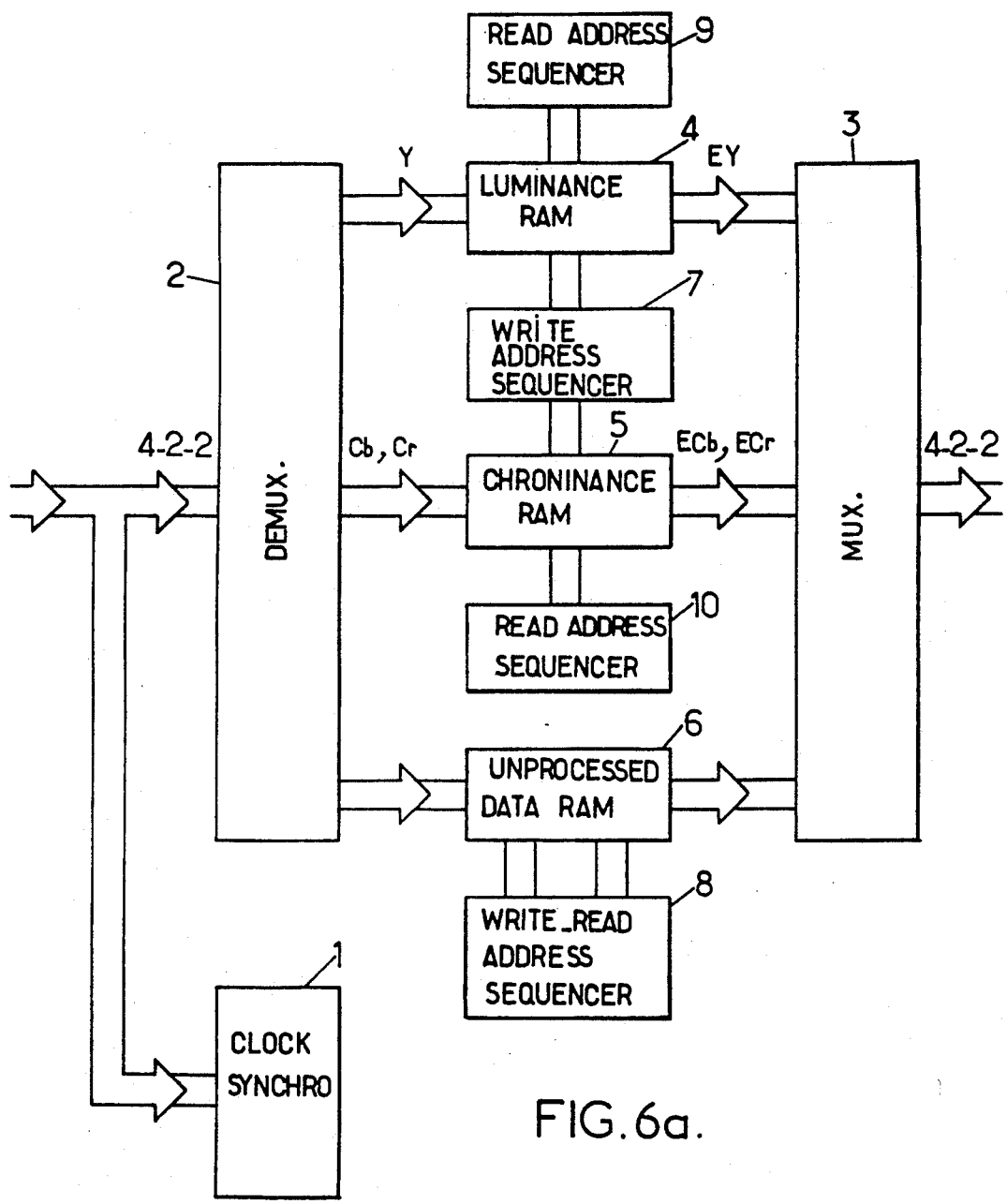
FIG. 6a is a diagram illustrating an advantageous non limitative embodiment of a device for implementing the method for scrambling respectively unscrambling the image data, in accordance with the method of the present invention, the scrambling procedure being used in the absence of or prior to the DCT compression processing, whereas the unscrambling procedure is used in the absence of or subsequent to the DCT$^{-1}$ decompression processing.

As shown in FIG. 6a, the device for scrambling-unscrambling multiplexed digital television images in accordance with the invention comprises a demultiplexer 2 for extracting the luminance Y and chrominance Cb, Cr components of the pixels forming the image as well as the suppression data components not subjected to the scrambling-unscrambling procedure.

The device also comprises a first circuit 4 and a second circuit 5 for storing in blocks pixels of the luminance respectively chrominance components. Storage in blocks thus allows a corresponding spatial chopping of the image to be generated.

Furthermore, a third storage circuit 6 is provided for storing the data not subjected to the scrambling-unscrambling procedure. This data, not subjected to processing, is for example the frame suppression data.

A mixing device is further provided, this device providing intra-block and/or inter-block mixing of the pixels of each component and comprising reading address and writing address sequencing circuits, of the storage circuits 4 and 5 mentioned above, for obtaining a scrambled arrangement of pixels as will be described hereafter.

Of course, a multiplexer circuit 3 is provided for re-constituting, from the blocks of scrambled luminance EY respectively chrominance ECb, ECr pixels and from the data not subjected to the processing, a scrambled image multiplex for providing the subsequent processing of the image data or transmission thereof.

As is further shown in FIG. 6a, from the digital television signal to the above format 4-2-2, circuit 1 allows the video synchronization references to be extracted and the different clock signals used to be delivered for driving the circuits of the other elements of FIG. 6a. The connections of circuit 1 to these elements are not shown in this figure, but circuit 1 delivers a byte clock signal, an active line clock signal, a suppression clock signal, a frame clock signal as well as clocks signals of blocks of $N \times N$ pixels, the number N being fixed at 8. Finally, circuit 1 delivers a signal of the video standard 525/60, 625/50 type.

In the embodiment shown in FIG. 6a, the first and second circuits for storing luminance Y respectively chrominance Cb, Cr components may advantageously comprise a first byte RAM referenced 4, this memory being used for storing the luminance components of the blocks of $N \times N$ pixels. The RAM 4 stores for example $2 \times 90$ blocks of $8 \times 8$ luminance pixels. The reading/writing sequencing of this memory is organized so that, during writing of the luminance data of a group of 90 blocks of 8×8 luminance pixels, i.e. 8 consecutive luminance active video lines, reading of the other group of 90 blocks of 8×8 luminance pixels, i.e. 8 active luminance video lines previously stored, takes place. The first memory circuit 4 is driven by a reading addressing sequencer 9 as will be described hereafter.

Furthermore, the second storage circuit comprises a second RAM byte circuit 5 for storing the chrominance components Cr, Cb of the blocks of N×N pixels. The RAM circuit 5 stores 2×90 blocks of 8×8 chrominance pixels, i.e. 45 block Cb plus 45 blocks Cr. The reading/writing sequencing of this memory is organized similarly to the sequencing of memory 4.

Reading addressing sequencing of the second storage circuit 5 is provided, this addressing sequencing being referenced 10.

Writing addressing sequencing of the first and of the second memory respectively 5, 5 is also provided for writing in then reading out from the first and second memories 4 respectively 5 so as to provide the intra-block or inter-block mixing procedure previously described relatively to the method of the invention.

In addition, a third RAM circuit 6 is provided, this RAM being formed of a byte RAM for storing 2×90 blocks of 8×8 pixels. Its purpose is to provide a delay buffer for the data not processed by the scrambling procedure of the present invention. A writing/reading addressing sequencer of the third RAM 6 is also provided for read-write sequencing of the non processed data.

The operation of the device of the invention such as shown in FIG. 6a is the following. The application of the scrambling-unscrambling methods and procedures to the groups of blocks of 8×8 pixels, 90 luminance blocks and 45 chrominance blocks Cr, Cb, is achieved by means of address sequencing circuits 9 and 10 which produce read address sequencing different from the write address sequencing at 7 for the two luminance respectively chrominance byte memory circuits.

The writing address sequencer 7 causes writing of the respective luminance Y and chrominance Cb, Cr data in the corresponding memories 4 and 5. Each group of 90 blocks of 8×8 luminance respectively chrominance pixels is written in the order of arrival of the samples after 4-2-2 demultiplexing, i.e. over eight consecutive active video lines. Referring to the notations given in the appendix to the present description and taking into account the following notations, the following relations may be written on the write addressing of a pixel inside a group of 90 blocks of 8×8 luminance pixels in the RAM 4:

By(n): block 8×8 pixels Y, n∈[0,90] from left to right
xy(n,i,j): address of the element i,j of the block BY(n)
$xy(n,i,j) = xy(n,o,o) + 720j + i$
$xy(n,o,o) = xy(n,o,o) + 8 \times n$ Similarly for the chrominance byte RAM 5 we have the following relations for the write addressing of the blocks of 8×8 pixels Cr and Cb:

BCB (n): block 8×8 pixels Cb, n∈[o, 45] from left to right
BCR(n): block 8×8 pixels Cr, n∈[o, 45] from the left to right
xCB (n,i,j): address of the element i,j of the block BCB(n)
xCR (n,i,j): address of the element i,j of the block BCR(n)
$xCB(n,i,j) = xCB(n,o,o) + 720j + 2i$
$xCR(n,i,j) = xCR(n,o,o) + 720j + 2i$
$xCB(n,o,o) = xCB(o,o,o) + 16n$
$xCR(n,o,o) = xCR(o,o,o) + 16n$
$xCR(o,o,o) = xCB(o,o,o) + 1$ The preceding relations reveal the breaking up of the addressing of the luminance and chrominance pixels x(n,i,j) into:

a constant term depending on the addressing in the RAM of the first pixel of the group of 90 blocks of 8×8 pixels: this addressing and this element being referenced x(0,0,0) and called hereafter group shift (or OFF group), a term depending solely on the position of the block in the group of 90 blocks, 8×n for the luminance blocks Y or 16×n for the chrominance blocks Cr/Cb, this term being designated hereafter by block shift (n) or (OFF block) (n), a term dependent solely on the position of the pixel in the block of 8×8 pixels, i.e. 720j+1 for the luminance blocks Y or 720j+2i for Cr/Cb, this term being designated hereafter by pixel shift (i,j) or (OFF pixel(i,j)).

Taking into account the preceding consideration, addressing of the pixels x(n,i,j) is written:
$x(n,i,j) = $ group shift + block shift $(n)$ + pixel shift $(i,j)$.

To apply the scrambling-unscrambling methods of the present invention by means of reading address sequencers 9 and 10 such as described in FIG. 6a, it is sufficient then:

to keep the value of group shift,
to mix the block shift addresses (n) for inter-block scrambling,
to mix the pixel shift addresses (i,j) for intra-block scrambling, to add the different terms so as to obtain the reading address delivered by 9 or 10.

A non limitative embodiment of the addressing sequencers 9 and 10 and described above in connection with FIG. 6a, will now be described in greater detail with reference to FIG. 6b.

As shown in this figure, the reading address sequencer 9 or 10 of the first respectively second RAM 4 or 5 comprises a first circuit 10 for shifting the address of the pixel blocks so as to provide inter-block scrambling, a second circuit 20 for shifting the address of the pixels for providing intra-block scrambling of the N×N pixels of each block and a common address generating circuit 16 receiving block and pixel shift addresses plus a group shift reference, this common circuit 16 delivering a reading address to the first respectively second RAM 4, 5.

Figure 6B:
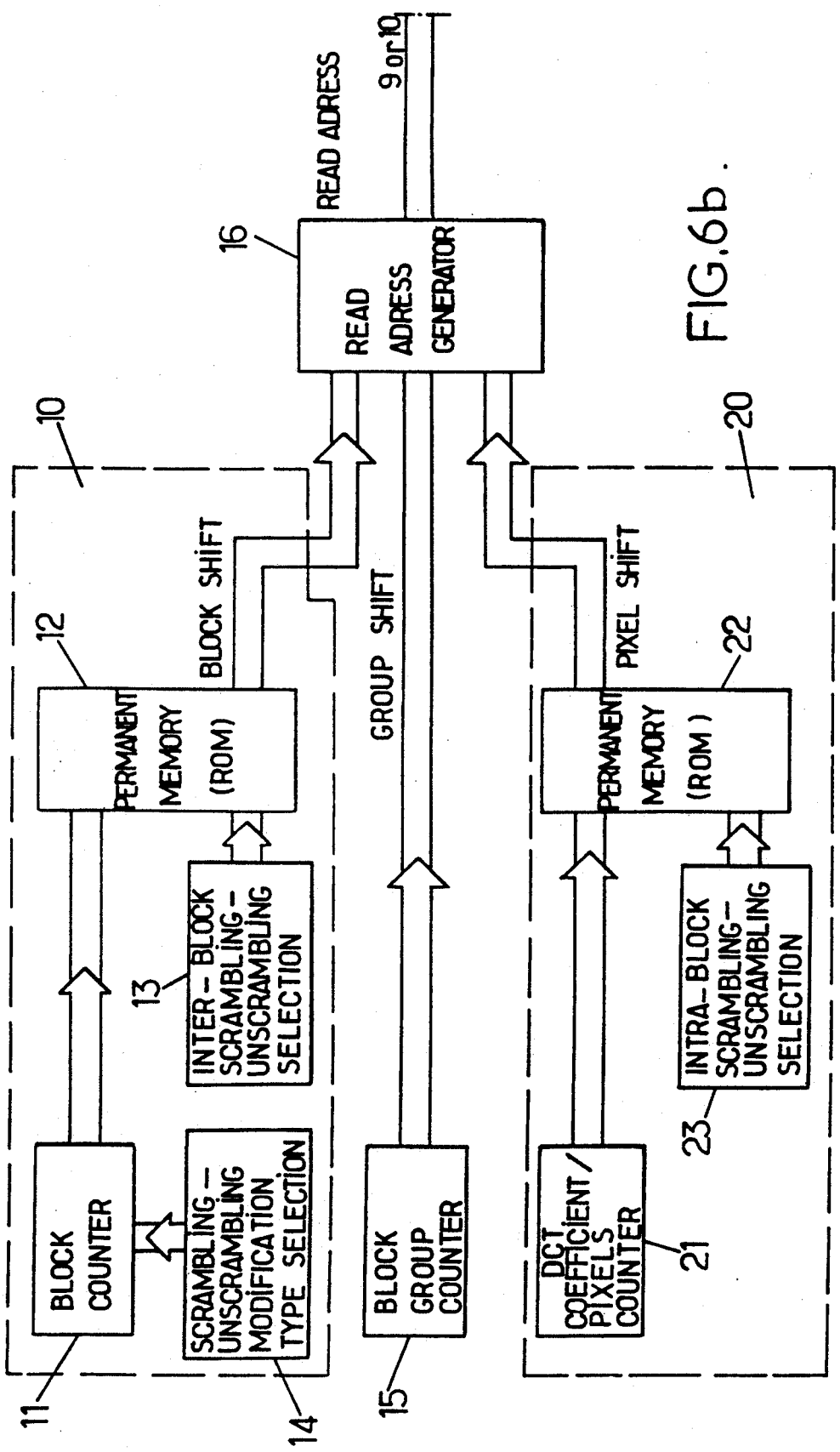
FIG. 6b shows a particular advantageous non limitative embodiment of component elements of the device shown in FIG. 6a, and FIG. 7 is a diagram illustrating an advantageous non limitative embodiment of a device for ensuring the procedure for scrambling-unscrambling image data, in accordance with the method of the present invention, the scrambling procedure being used on DCT coefficient blocks and the unscrambling procedure being used on scrambled DCT coefficient blocks, prior to DCT$^{-1}$ decompression processing.

As is clear from FIG. 6b, the first circuit for shifting the addresses of the blocks of pixels comprises a block counter 11 which is formed by a modulo 90 block counter controlled by the synchronization and clock circuit 1, although the corresponding connections, as already mentioned, have not been shown. The block counter 11 delivers the number of the current block to be processed. In the case of processing chrominance Cr and Cb blocks, the memory 5 containing 90 chrominance blocks comprises 45 Cb blocks and 45 Cr blocks, the blocks Cb being referenced by an even number and the blocks Cr by an uneven number. The block counter 11 is then adapted for modulo 45 counting, a chrominance Cb or Cr block selection bit, not shown in the figure, being used for delivering in agreement with the digital television multiplexing law, the chrominance samples with Cb, Cr alternation, this selection bit being used for completing the bits of the modulo 45 counter and delivering a value between 0 and 89. The first pixel block address shift circuit 10 also comprises a permanent memory 12, a ROM type memory, this memory being accessible only for reading. The above memory 12 associates with each input value, value from 0 to 89, an output value of 0 to 89 defined by the inter-block permutation law. The output values delivered by the permanent memory 12 deliver the block (n) shift address terms which provide inter-block scrambling.

In order to have a variety of inter-block scrambling types, it is of course possible to use a ROM type memory 12 containing a plurality of different scrambling tables and to select the scrambling table by adding a shift to the reading address of memory 12. Circuit 13 provides the corresponding inter-block scrambling-unscrambling selection by causing a shift on the reading address of said memory 12. Furthermore, the first pixel block address shift circuit 10 comprises a circuit 14 for selecting the modification of the type of scrambling-unscrambling. The purpose of this circuit 14 is to initialize the block counter 11 with a non zero value at the beginning of rereading reading of the group of 90 blocks. This technique generates 90 different inter-block scrambling types from a single correspondence table of the permanent memory 12. Circuit 14 thus provides external interfacing for selecting modification of the type of scrambling.

Similarly, the second pixel address shift circuit 20, shown in FIG. 6b, provides intra-block scrambling of the pixels of each block. It will thus be understood that circuits 21 form a pixel counter whose operation is substantially similar to the above block counter 11. Of course, the pixel counter 21 is a counter counting pixels by blocks of 8×8 modulo 64, which is controlled by the synchronization and clock circuit 1. The pixel counter 21 associates with each output value a single pair i,j by the relation 8j+i.

Similarly, a permanent ROM type memory 22 is provided, this memory containing the tables for mixing pixels inside the block of 8×8 pixels, in fact 64 elements.

Finally, circuit 23 provides selection of the intra-block scrambling-unscrambling and serves for external interfacing for selecting the intra-block scrambling or unscrambling type used. Of course, on reading the permanent ROM memory 22, the values delivered thereby correspond to the pixel shift reading address terms (i,j), this shift term providing intra-block scrambling, as was described above in connection with the method of the invention.

In FIG. 6b, the presence will also be noted of the block group counter 15 which is also controlled by the synchronization and clock circuit 1. The block group counter 15 delivers the group shift address term of the group of 90 blocks of 8×8 pixels being processed. The different group shift addresses, block shift (n) and pixel shift (i,j), are then delivered as shown in FIG. 6b to the reading address generator 16 which generates the reading address delivered by 9 or 10 by simply adding the addresses, block shift, group shift, pixel shift, the addition being of course a logic addition.

It will be noted that the use alone of the inter-block or intra-block scrambling methods may be achieved by means of the reading address sequencer such as shown in FIG. 6 for the corresponding operating modes are independent.

It will also be noted that for the unscrambling operations, it is sufficient to use the same equipment such as shown in FIGS. 6a and 6b with only the following adaptations:

replacement of the permanent inter-block scrambling ROM type memory 12 by a similar type memory organized identically but containing the mixing tables which are the reverse of those used for scrambling, replacement of the permanent intra-block scrambling ROM type memory 22 by a permanent memory of the same type organized identically but containing the mixing tables which are the reverse of those used for scrambling, modification of the type of scrambling-unscrambling modification selection circuit so as to apply a reverse shift to the block counter 11.

The variety of actions possible for modifying the type of scrambling applied to the group of 90 blocks of pixels may be applied so as to use a different scrambling method for each group. It is for example possible to use pseudo-random sequence generators re-initialized in frames or images for controlling the inter-block 13 or intra-block 23 scrambling-unscrambling selection circuits as well as the type of scrambling-unscrambling modification selection circuit 14.

It will be noted that the device described in connection with FIGS. 6a and 6b uses intra-block and inter-block scrambling on the blocks formed from the chrominance Cr, Cb or luminance Y components relatively to blocks of 8×8 pixels.

Furthermore, this device effects permutations between blocks of different kinds such as the chrominance blocks Cr, Cb.

The whole of the processing applies to image portions formed of 8 consecutive digital active video lines, namely:

45 blocks Cr 8×8,
45 blocks Cb 8×8
90 blocks Y 8×8.

For each active image portion thus formed, different processing procedures may be applied and the suppression data not handled by the DCT processing in accordance with the recommendations of the document CMTT 303 are not scrambled by the device.

Figure 7:
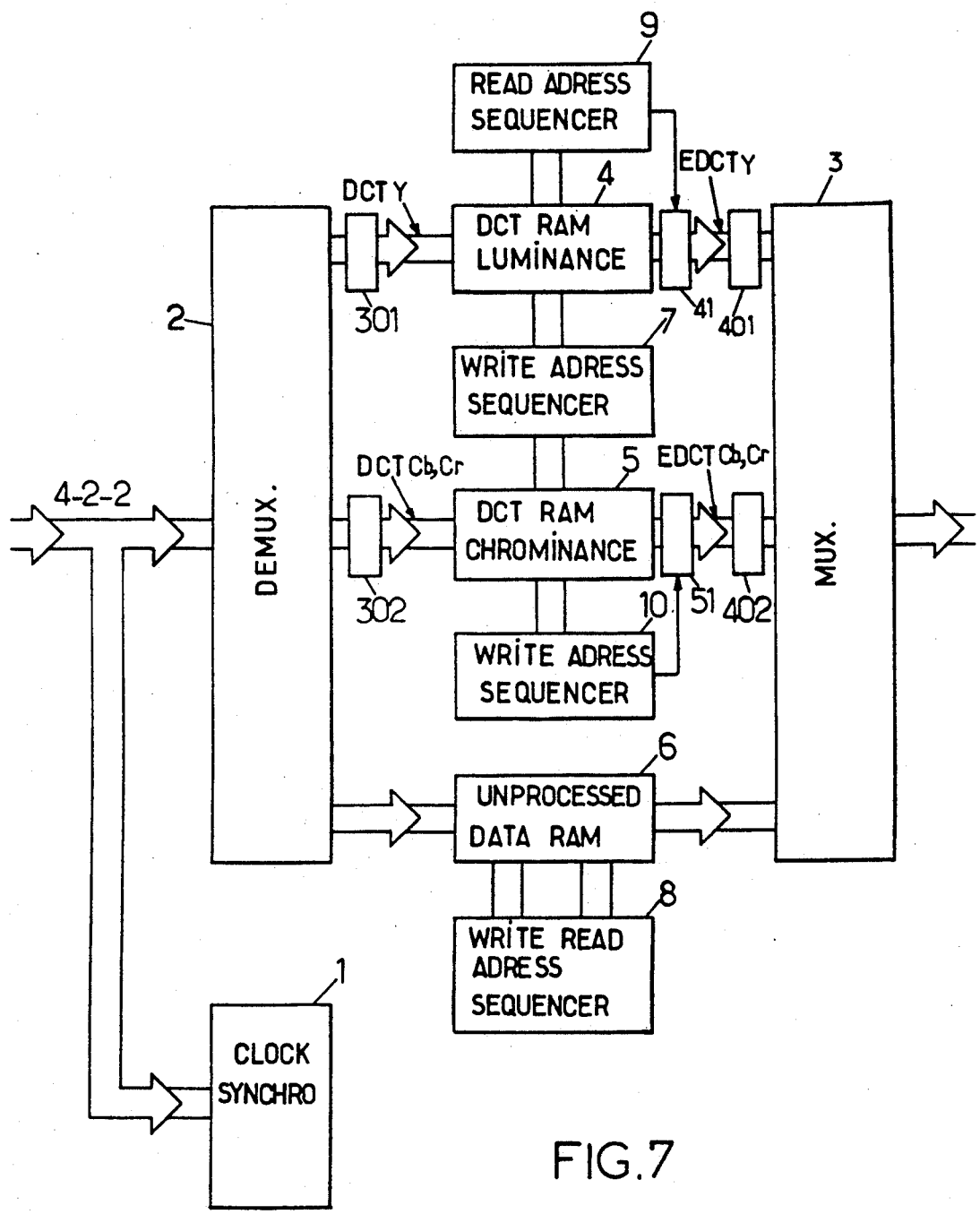

Of course, the device of the invention such as shown in FIGS. 6a and 6b may also be used relatively to the DCT luminance and chrominance coefficients. In this case, as shown in FIG. 7, the assembly formed by the first and second RAMs, respectively 4 and 5, the reading addressing sequencer of the first and second RAMs respectively 9 and 10 are adapted so that the first and second RAMs are configured for storing DCT coefficients, these coefficients being transmitted from a DCT processor having a buffer memory 301, 302 on each luminance respectively chrominance channel in a transmission sequence similar to the sequence for transmitting the luminance respectively chrominance components of the pixels. In FIG. 7, it will be noted that the demultiplexer 2 is followed by a DCT processor with buffer memory 301, 302 in each luminance respectively chrominance channel, the clock synchronization circuit keeping essentially the same functions for providing transmissions from circuits 301, 302 in a transmission sequence similar to the sequence for transmitting the luminance and chrominance components of the pixels. Of course, similarly, multiplexer 3 is then preceded by an inverse DCT processor with a buffer memory 401, 402 which store the scrambled DCT coefficients referenced respectively for the luminance component ETCDY and for the chrominance ETCD Cb, Cr, and restoring the corresponding pixels. In this case, the operation is substantially similar to the operation of the device such as shown in FIGS. 6a and 6b.

In FIG. 7 will also be noted the circuits 41 and 51 for modifying the sign of the DCT coefficients during processing or not.

The reading address sequences 9 and 10 are adapted so as to deliver in addition to the DCT coefficient reading address, a bit for indicating whether the coefficient must change sign.

This sign change information corresponds to the use of an additional bit in the DCT coefficient intra-block scrambling storage ROM 22 (FIG. 6b). Finally, it will be noted, as moreover shown in FIG. 6b, that counter 21 then corresponds to a DCT coefficient counter in place of the pixel counter.

APPENDIX

NOTATIONS AND DEFINITIONS

Notations used for the DCT processing over N×N blocks b(i,j): block of N×N pixels of address I,J in the image
I: line index of blocks of pixels in the image (0 to P-1 from left to right)
J: column index of blocks of pixels in the image (0 to Q-1 from top to bottom)
x(i,j): pixel of address i,j in a blocks of pixels
xr(i,j): pixel in a reference block of N×N pixels
xe(i,j): pixel in a scrambled block of N×N pixels
(i,j): coordinates in the block of N×N pixels
i: line index (0 to N-1 from left to right)
j: column index (0 to N-1 from top to bottom)
X(k,l): DCT coefficient in a block of N×N DCT coefficients
Xr(k,l): DCT coefficient in a reference block of N×N DCT coefficients
Xe(k,l): DCT coefficient in a scrambled block of N×N DCT coefficients
(k,l): coordinates in the DCT transformation field
k: line index (0 to SN-1 from left to right)
l: column index (0 to N-1 from top to bottom)

Definition of the discrete cosine transform

Direct Transform $$X(k,l) = \frac{4}{N^2} CkCl \sum_{i=0}^{N-1} \sum_{j=0}^{N-1} x(i,j) \cos \frac{\pi(2i+1)k}{2N} \cos \frac{\pi(2j+1)l}{2N}$$

Inverse transform $$x(i,j) = \sum_{k=0}^{N-1} \sum_{l=0}^{N-1} CkCl \, X(k,l) \cos \frac{\pi(2i+1)k}{2N} \cos \frac{\pi(2j+1)l}{2N}$$

with $$Ck = \frac{1}{\sqrt{2}} \text{ for } k = 0, \quad Cl = \frac{1}{\sqrt{2}} \text{ for } l = 0$$

$$Ck = 1 \text{ elsewhere} \quad Cl = 1 \text{ elsewhere}$$

I claim:

1. Method for scrambling-descrambling digital image data, the method for scrambling-descrambling comprising:
   a) subjecting said data to processing for extracting the colorimetric components of the pixels forming the image,
   b) forming said components into blocks b(I, J) of N×N pixels x(i,j) so as to generate corresponding spatial chopping of the image, where I designates a left to right line index and J a top to bottom column index of arrangement of the blocks in the image and i designates a line index and j column index of arrangement of the pixels in each block,
   c) then subjecting said blocks pixels and/or block to a mixing procedure so as to obtain a scrambled arrangement of blocks.

2. The method as claimed in claim 1, further comprising:
   subjecting each block relative to each of the coefficients to discrete cosine transform (DCT) processing so as to obtain corresponding blocks of DCT coefficients X(k,l) where k designates a line index and l a column index of the DCT coefficients in the blocks of N×N corresponding DCT coefficients, and
   carrying out said mixing procedure with respect to said blocks of DCT coefficients X(k,l) subsequent to the discrete cosine transform processing procedure.

3. The method as claimed in claim 2, wherein said mixing procedure is carried out with respect to said blocks of pixels x(i,j) prior to the discrete cosine transform processing procedure.

4. The method as claimed in claim 2, wherein said mixing procedure comprises modifying the sign of the DCT coefficients X(k,l), the amplitude of said DCT coefficients X(k,l) being maintained.

5. The method as claimed in claim 4, wherein said intra-block scrambling procedure comprises an inversion of the chrominance components of the pixels of said corresponding pixel block.

6. The method as claimed in claim 2, wherein, for broadcasting digital television images, said method comprises, at emission, following processing for forming analysis blocks of N×N pixels,
   a step for discrete cosine transform processing of the colorimetric components of the N×N pixels xr(i,j) of each block b(I,J) so as to obtain N×N DCT coefficients Xr(k,l) for each corresponding analysis block.
   a scrambling procedure step for obtaining for each analysis block of N×N DCT coefficients Xr(k,l) a block of scrambled DCT coefficients Xe(k,l),
   a step for inverse discrete cosine transform (DCT$^{-1}$) processing of the scrambled DCT coefficients Xe(k,l) for obtaining for each analysis block a scrambled distribution of blocks of pixels xe(i,j), and
   a processing step for forming the digital scrambled image multiplex for broadcasting.

7. The method as claimed in claim 6, wherein, for broadcasting digital television images, said method comprises at reception, following processing for forming the analysis blocks of N×N pixels xe(i,j) of scrambled images,
   a step for processing by discrete cosine transformation DCT of the chrominance and luminance components of the N×N pixels of each scrambled block, so as to obtain N×N scrambled DCT coefficients Xe(k,l) for each block,
   a descrambling procedure step, corresponding to the inverse transformation of the scrambling procedure, so as to obtain for each analysis block of N×N scrambled DCT coefficients Xe(k,l), a block of DCT reference coefficients Xr(k,l), representative of an unscrambled block, a step for processing by discrete cosine transform $DCT^{-1}$ for obtaining for each block of DCT coefficients Xr(k,l), an unscrambled distribution of the luminance and chrominance components of the corresponding block of the N×N pixels xr(i,j), and a step for forming the digital multiplex of unscrambled reference image data from the blocks of N×N unscrambled pixels xr(i,j).

8. The method as claimed in claim 2, wherein said mixing procedure comprises modifying the absolute address of the DCT coefficients, the amplitude of the DCT coefficients being maintained.

9. The method as claimed in claim 1, wherein scrambling is obtained by a sequential combination of successive steps comprising a succession of steps of said discrete cosine transformation processing and said mixing procedure, the successive steps being applied to the different blocks.

10. The method as claimed in claim 1 wherein said image data is formed by multiplexed digital television image data, and said mixing procedure comprises an intra-block scrambling procedure comprising an inversion of the luminance and/or chrominance colorimetric components of the pixels of the corresponding pixel block.

11. The method as claimed in claim 10, wherein said intra-block scrambling procedure comprises an inversion of the luminance components of the pixels of said corresponding pixel block.

12. The method as claimed in claim 1, wherein scrambling-descrambling is applied to the blocks of pixels, and scrambling and descrambling procedures are applied directly to blocks of reference pixels xr(i,j) and scrambled pixels xe(i,j).

13. The method as claimed in claim 1, wherein said mixing procedure comprises an intra-block mixing procedure comprising a given re-arrangement of said blocks of pixels.

14. The method as claimed in claim 1, wherein said mixing procedure comprises an intra-block mixing comprising a given re-arrangement of the pixels of each block so as to obtain a scrambled arrangement of the pixels of the blocks.

15. The method as claimed in claim 14, wherein said mixing procedure further comprises an inter-block mixing procedure comprising a given re-arrangement of said blocks of pixels.

16. A device for scrambling-descrambling multiplexed digital television image data, said digital image data comprising video data that undergo a scrambling-descrambling operation together with auxiliary data that are not subjected to said scrambling-descrambling operation, this video data being subjected to compression to enable transmission thereof, said device comprising:

demultiplexing means for extracting the luminance and chrominance components of the pixels forming the image and the data not subjected to the scrambling-unscrambling operation, first and second means for storing in blocks pixels of the luminance and chrominance components so as to generate corresponding spatial chopping of the image, said blocks b(I,J) of pixels being stored at corresponding addresses I, J where I designates a line index and J a column index of arrangement of the blocks of the image, third means for storing said data not subjected to the scrambling-unscrambling operation, and mixing means for mixing said pixels x(i,j) of each block b(I,J) so as to obtain a scrambled arrangement of blocks of pixels.

17. The device as claimed in claim 16, wherein the first and second means for storing the respective luminance and chrominance components comprise:

a first byte RAM for storing the luminance components of said blocks of N×N pixels, a read addressing sequencer for said RAM, a second byte RAM for storing the chrominance components of said block of N×N pixels, a read addressing sequencer for said second RAM, and a write addressing sequencer for said first and second RAMs.

18. The device as claimed in claim 17, wherein said read address sequencer for said first respectively second RAM comprises:

a first circuit for shifting the address of the blocks of pixels for providing inter-block scrambling, a second circuit for shifting the address of pixels for providing intra-block scrambling of the N×N pixels of each block, and a common address generator circuit receiving the block shift and pixel shift addresses and delivering a read address to the first respectively second RAM.

19. The device as claimed in claim 18, wherein, for scrambling discrete cosine transform (DCT) coefficients representative of digital images, the demultiplexer is followed by a DCT processor having a buffer memory in each respective luminance and chrominance channel, the corresponding DCT coefficients of respective DCT luminance Y and DCT chrominance Cb, Cr being transmitted in a transmission sequence, similar to the sequence for transmitting the respective luminance and chrominance components of the pixels, the multiplexer being preceded in each respective luminance and chrominance channel by an inverse DCT processor having a buffer memory, said buffer memory storing the respective scrambled DCT luminance and chrominance coefficients referenced EDCTY and EDCT Cr Cb, said addressing sequencers being adapted for further delivering a bit for changing the sign of the DCT coefficients, each of the respective luminance and chrominance channels comprising a respective circuit for changing the sign of the DCT coefficients disposed upstream of the respective inverse DCT processor and receiving said sign change bit from said addressing sequencers.

20. The device as claimed in claim 16, wherein said mixing means comprises means for providing inter-block mixing.

21. The device as claimed in claim 16, wherein said mixing means comprises means for providing intra-block mixing.

22. The device as claimed in claim 16, wherein said mixing means comprises means for providing both inter-block mixing and intra-block mixing.

* * * * *